United States Patent
Johansson et al.

(10) Patent No.: US 10,541,993 B2
(45) Date of Patent: *Jan. 21, 2020

(54) CONFIDENCE-BASED AUTHENTICATION

(71) Applicant: Amazon Technologies, Inc., Seattle, WA (US)

(72) Inventors: Jesper Mikael Johansson, Redmond, WA (US); Darren Ernest Canavor, Redmond, WA (US); Daniel Wade Hitchcock, Bothell, WA (US); Chandra Sekhar Venkata Bhanu Vijyapurpu, Andhra Pradesh (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,339

(22) Filed: Apr. 25, 2018

(65) Prior Publication Data

US 2018/0248865 A1 Aug. 30, 2018

Related U.S. Application Data

(63) Continuation of application No. 15/335,853, filed on Oct. 27, 2016, now Pat. No. 9,967,250, which is a continuation of application No. 14/105,836, filed on Dec. 13, 2013, now Pat. No. 9,485,237, which is a continuation-in-part of application No. 13/277,026, filed on Oct. 19, 2011, now Pat. No. 8,621,209.

(51) Int. Cl.
*G06F 17/00* (2019.01)
*H04L 29/06* (2006.01)
*G06Q 20/40* (2012.01)

(52) U.S. Cl.
CPC ............ *H04L 63/083* (2013.01); *H04L 63/08* (2013.01); *H04L 63/0861* (2013.01); *G06Q 20/4014* (2013.01); *G06Q 20/40145* (2013.01)

(58) Field of Classification Search
CPC ... H04L 63/08; H04L 63/083; H04L 63/0861; H04L 9/3271; H04L 9/3231; G06Q 20/40145; G06Q 20/4014; H04W 4/80
USPC .......................................................... 726/1
See application file for complete search history.

(56) References Cited

U.S. PATENT DOCUMENTS

| 8,621,209 B1 | 12/2013 | Johansson et al. |
| 9,053,307 B1 | 6/2015 | Johansson et al. |

(Continued)

OTHER PUBLICATIONS

U.S. Appl. No. 13/194,287 entitled "Managing Security Credentials," filed Jul. 29, 2011.

*Primary Examiner* — Mohammad W Reza
(74) *Attorney, Agent, or Firm* — Thomas | Horstemeyer, LLP

(57) ABSTRACT

Disclosed are various embodiments that perform confidence-based authentication of a user. An identification of a user account is obtained from a user, and a minimum confidence threshold is determined. Multiple authentication challenges are presented to the user. Responses are obtained from the user to one or more of the challenges, with each response having a corresponding authentication point value. A confidence score is generated for the user, where the confidence score is increased by the respective authentication point values of the correct responses. The user is authenticated as being associated with the user account in response to determining that the confidence score meets the minimum confidence threshold.

20 Claims, 9 Drawing Sheets

(56) References Cited

U.S. PATENT DOCUMENTS

| | | | |
|---|---|---|---|
| 2003/0190592 A1* | 10/2003 | Bruno | G09B 7/06 |
| | | | 434/322 |
| 2005/0216768 A1* | 9/2005 | Eppert | G06F 21/31 |
| | | | 726/5 |
| 2009/0276839 A1 | 11/2009 | Peneder | |
| 2012/0072975 A1* | 3/2012 | Labrador | G06F 21/31 |
| | | | 726/6 |

* cited by examiner

CONFIDENCE-BASED AUTHENTICATION

CROSS-REFERENCE TO RELATED APPLICATIONS

This application is a continuation of, and claims priority to, co-pending U.S. patent application entitled "CONFIDENCE-BASED AUTHENTICATION," filed on Oct. 27, 2016, and assigned application Ser. No. 15/335,853, which is a continuation of, and claims priority to, U.S. Patent Application entitled "CONFIDENCE-BASED AUTHENTICATION," filed on Dec. 13, 2013, and assigned application Ser. No. 14/105,836, and issued on Nov. 1, 2016 as U.S. Pat. No. 9,485,237, which is a continuation-in-part of, and claims priority to, U.S. Patent Application entitled "CONFIDENCE-BASED AUTHENTICATION," filed on Oct. 19, 2011, assigned application Ser. No. 13/277,026, and issued on Dec. 31, 2013 as U.S. Pat. No. 8,621,209, which are incorporated herein by reference in their entireties.

BACKGROUND

Verifying the identity of a person or group of people, referred to as authentication, has many uses in the context of computing. People often have multiple user accounts—accounts in the operating systems of their computing devices, accounts with social networking sites, accounts with online retailers, and so on—that employ some type of authentication before access to the account is granted. In many cases, these accounts are configured to authenticate a user depending on whether the user provides a correct username and password combination. If the user provides a correct username and password, access to account resources is granted. If the user does not provide a correct username and password, access to account resources is denied.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to confidence-based authentication systems. Authentication typically involves a user presenting a username along with a password, a key, a personal identification number, and/or another form of security credential. Evaluation of the security credential produces a binary result: either the user is authenticated, or the user is not authenticated. Consequently, malicious users may gain access to the account if they have access to the security credential. Conversely, legitimate users may lose access to the account if they forget the security credential.

Various embodiments of the present disclosure implement a confidence-based authentication system where a user may be presented with multiple authentication questions that may have varying point values. Point values associated with correctly answered questions are used to generate a confidence score. In some cases, various other forms of proof may be elicited from a user in addition to, or in place of, answers to questions. For example, face recognition, voice recognition, device identity, and/or other forms of proof may be employed, and varying point values may be assigned to each. When the confidence score meets a minimum confidence threshold, the user is authenticated and access may be granted to secured resources. In the following discussion, a general description of the system and its components is provided, followed by a discussion of the operation of the same.

Figure 1A:
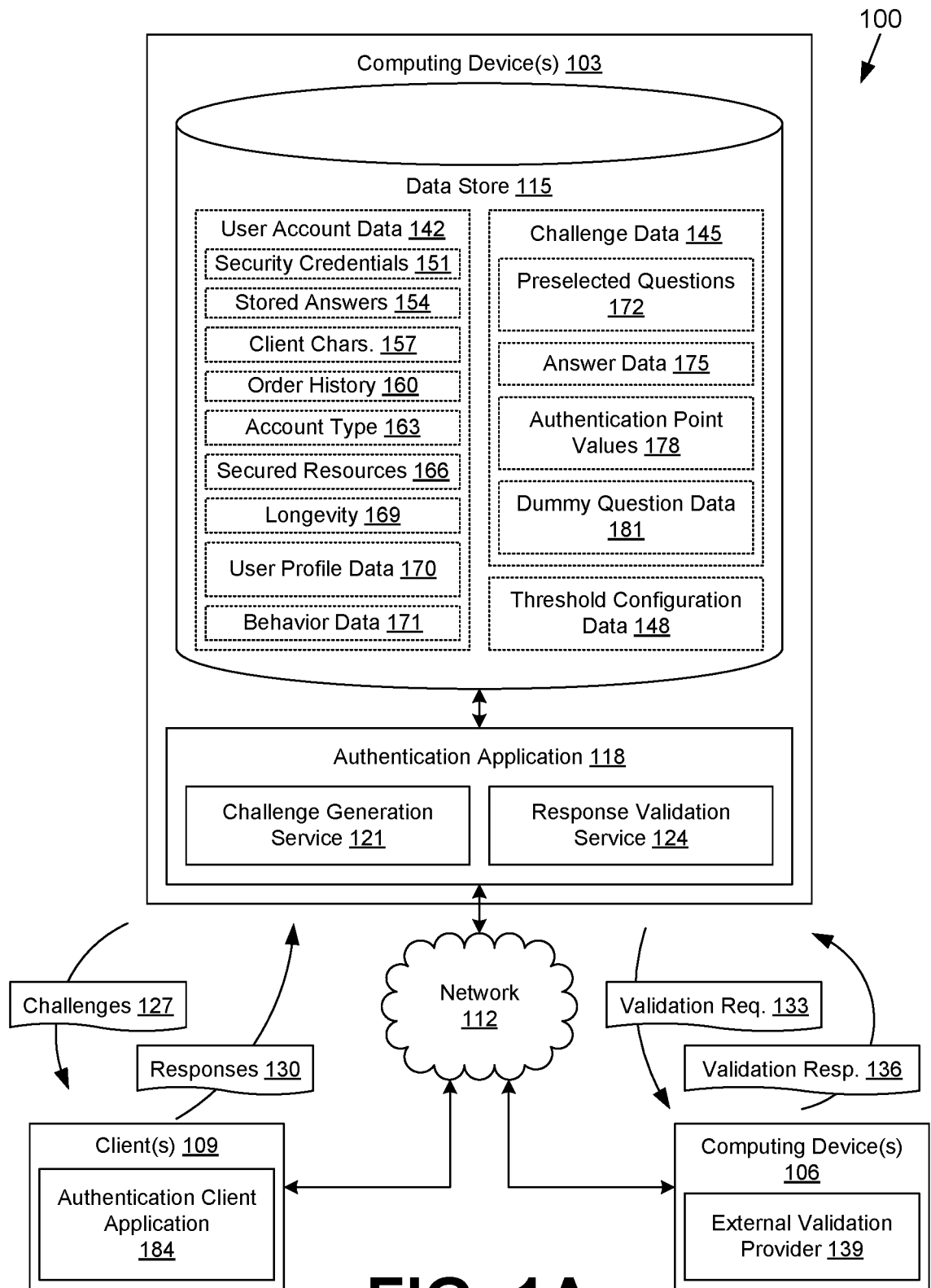
FIGS. 1A and 1B are drawings of networked environments according to various embodiments of the present disclosure.

With reference to FIG. 1A, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include an authentication application 118 and other applications, services, processes, systems, engines, or functionality not discussed in detail herein. The authentication application 118 is executed to authenticate users in order to authorize access to secured resources. To this end, the authentication application 118 may include a challenge generation service 121, a response validation service 124, and/or other components. The challenge generation service 121 is configured to generate a set of authentication challenges 127, which are presented to the user at the client 109. The authentication challenges 127 may correspond, for example, to knowledge-based questions, prompts for face recognition, prompts for voice recognition, prompts for fingerprint recognition, and/or prompts for security credentials.

Responses 130 to one or more of the challenges 127 are obtained from the client 109, and then evaluated by the response validation service 124. The response validation service 124 is configured to determine whether the response 130 to a challenge 127 is correct. In some cases, the response validation service 124 may submit validation requests 133 to, and receive validation responses 136 from, an external validation provider 139 executed in the computing device 106. Depending on the correct or incorrect responses 130 that are provided, a confidence score is generated by the authentication application 118. If the confidence score meets a minimum confidence threshold, access to one or more secured resources is authorized for the user at the client 109. If the confidence score does not meet the minimum threshold, additional challenges 127 may be generated and presented to the user. If the confidence score falls beneath a negative confidence threshold, access to any secured resource of the account may be denied.

The data stored in the data store 115 includes, for example, user account data 142, challenge data 145, threshold configuration data 148, and potentially other data. The user account data 142 includes data associated with various user accounts for which the authentication application 118 performs authentication. The user account data 142 may include, for example, security credentials 151, stored answers 154, client characteristics 157, order history 160, an account type 163, secured resources 166, information about longevity 169, user profile data 170, behavior data 171, and/or other data. The security credentials 151 may include passwords, hashes of passwords, public-key encryption data, data to validate one-time passwords, data to validate personal identification number (PIN) values, biometric identity data, and/or other data. The stored answers 154 may include stored valid answers to preconfigured authorization challenges 127, or their hash values, which are stored as a result of forced or voluntary knowledge-based question enrollment.

The client characteristics 157 may define various characteristics associated with the clients 109 employed by users of the respective account. Such client characteristics 157 may include unique device identifier information, cookie information, client 109 locations (e.g., ZIP codes, global positioning system (GPS) location coordinates, geolocation results, etc.), internet protocol (IP) addresses, wireless base stations (e.g., cell stations, wireless network access points, etc.) employed by the client 109, whether a specific hardware module has been used in connection with the respective client 109, and/or other characteristics that may be associated with use of the clients 109. The order history 160 may correspond to a purchase or transaction history for products, services, downloads, and/or other items associated with the user account. For example, the user account may correspond to an account with a merchant or electronic marketplace for which a purchase history may be available. The order history 160 may include transaction data associated with purchase transactions, account enrollment transactions, etc.

An account may be associated with one or more account types 163 from a selection of multiple account types 163. For example, a user account may be for a customer, a merchant, a developer, a payments clerk, a system administrator, and so on. Different types of accounts may be associated with different privileges and may be subject to varying levels of security. The secured resources 166 may correspond to various resources to which the user may gain access through authentication.

As non-limiting examples, the secured resources 166 may include a directory or file system in a networked storage system, an email account, a password change or reset utility, an order management portal for merchants, an order management portal for customers, and/or other resources. Moreover, in various embodiments, the secured resources 166 may correspond to tangible resources for which physical access is controlled by the authentication application 118. Non-limiting examples of such tangible resources may include building doors, locks, physical safes, and so on.

The information about longevity 169 may describe how long the corresponding user account has been active, creation date for user account, and/or other information. Values may describe the longevity 169 for various configuration settings in the user account such as billing addresses, telephone numbers, etc. The user account data 142 may include other information such as social security numbers or portions thereof, payment instrument information, demographic information, mailing addresses, physical addresses, etc.

The user profile data 170 may include biometric characteristics of one or more users associated with the account. Such characteristics may enable facial recognition, fingerprint recognition, voice recognition, and so on, of the user. To this end, the user profile data 170 may include stored samples from audio of the user's voice, stored samples from the user's image, characteristics derived from the user's voice, facial image, fingerprint image, user heart rate, user body temperature, user handwriting, and so on. The user profile data 170 may also record unique identifiers associated with the user's clothing (e.g., from radio-frequency identifiers (RFIDs) or other identifiers embedded in the user's clothing). In some cases, the user may have a surgically implanted unique identifier or other physical identifier that is uniquely associated with the user. The user profile data 170 may record such identifiers for purposes of authentication. The user profile data 170 may be used by the response validation service 124 and/or the external validation provider 139 to validate biometric responses 130 to challenges 127.

The behavior data 171 may include data corresponding to behavioral events that have been observed as being performed by an authenticated user in one or more user sessions. Such behavioral events may be associated with a time stamp or time window, as they may be regularly occurring events associated with the user identity. Such behavioral events may include recorded behaviors that are performed, and may be monitored, client side, such as typing frequency, typing cadence, key-press duration, frequency of scrollbar use, and/or other behavioral characteristics that may be consistent for a user. Other observable behavior characteristics of the user that may be used for authentication may include user reading speed (e.g., the rate at which the user reads words), user walking gait (e.g., determined by an accelerometer or gyroscope), and so on. Various dimensions to the behavioral events may include categories of items purchased, locations of the client 109, and at which times of the day or times of the year a network site is accessed or a behavioral event is completed.

The challenge data 145 includes data relevant to the generation of challenges 127 by the challenge generation service 121 and the validation of responses 130 by the response validation service 124. The challenge data 145 may include, for example, preselected questions 172, answer data 175, authentication point values 178, dummy question data 181, and/or other data. The preselected questions 172 may correspond to questions that are preselected by the user and/or the authentication application 118 through, for example, forced or voluntary enrollment. The preselected questions 172 may have corresponding stored answers 154 associated with the user account data 142 of the user.

The answer data 175 may include data used to validate responses 130 involving knowledge-based questions by the response validation service 124. The authentication point values 178 are assigned to each challenge 127 generated by the challenge generation service 121. The authentication point values 178 are employed to weight the responses to the challenges 127 in generating confidence scores. The dummy question data 181 is used to create dummy question challenges 127 that are designed to elicit an incorrect response from invalid users. For example, a dummy question challenge 127 may include four multiple choice answers including a "none of the above" choice, where "none of the above" is the correct answer.

The threshold configuration data 148 specifies the minimum confidence thresholds for confidence scores which are employed in various situations before a user is authenticated. For example, the minimum confidence threshold may differ based at least in part on the account type 163, the secured resources 166 to be accessed, the longevity 169 of the account, and/or other factors. Additionally, the threshold configuration data 148 may specify negative confidence thresholds and/or inverse confidence thresholds that are used to determine a confidence that the user is not associated with the account.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data may be stored in a data store that is accessible to the computing device 106. The components executed on the computing device 106, for example, include an external validation provider 139 and other applications, services, processes, systems, engines, or functionality not discussed in detail herein. The external validation provider 139 is executed to validate various information as requested by the response validation service 124. To this end, the external validation provider 139 obtains validation requests 133 from the response validation service 124 over the network 112 and generates validation responses 136 that are returned to the response validation service 124 over the network 112. In one non-limiting example, the external validation provider 139 may validate a payment instrument such as a credit card according to a credit card number, billing address, verification code, etc. In another non-limiting example, the external validation provider 139 may validate a tax identifier. In still another non-limiting example, the external validation provider 139 may perform facial recognition within an image captured by a client 109.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, kiosks, or other devices with like capability. The client 109 may include a display such as, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as an authentication client application 184 and/or other applications. The authentication client application 184 is configured to present challenges 127 to the user at the client 109 and to obtain responses 130 from the user. In one example, the authentication client application 184 may correspond to a browser application that obtains network page data from the authentication application 118 or another network page server. The authentication client application 184 may then render a user interface for obtaining responses 130 to the challenges 127. In another example, the authentication client application 184 may correspond to a customer service application in use by a customer service agent who is in communication with the user by way of a telephone. The customer service agent may then present the challenges 127 and obtain the responses 130 and then populate a user interface. The client 109 may be configured to execute applications beyond the authentication client application 184 such as, for example, mobile applications, browser applications, email applications, instant message applications, and/or other applications.

Next, a general description of the operation of the various components of the networked environment 100 is provided. To begin, a user initiates an authentication process through the authentication client application 184. For example, the user may be seeking to gain access to a user account of an electronic commerce system. Alternatively, the user may be attempting to open a secured physical door associated with a user account. Although the present disclosure discusses a user attempting to gain access, the user may correspond to a group of users. Indeed, some systems may require the presence of multiple users to authenticate access to an account, where each of the users provides some security credential 151. Many different examples may be employed relating to identifying a person or group of people and are applicable to the disclosure herein.

The authentication client application 184 may present a user interface to the user, such as a rendered network page, a mobile application, etc. Alternatively, a person may interact with a customer service agent or other intermediary by telephone, email, or other form of communication, and the agent may have access to the user interface on behalf of the user. The user provides some indication of the account to which access is desired. This indication may correspond to a name, username, identifying number, etc. In one embodiment, the indication may use a biometric form of identification.

The challenge generation service 121 of the authentication application 118 then determines a set of authentication challenges 127 that will be presented to the user by way of the user interface, and possibly also through an intermediary such as a customer service agent. The set of challenges 127 may be selected based at least in part on the preselected questions 172, the account type 163, the secured resources 166, factors relating to longevity 169, client characteristics 157, and so on. The challenges 127 may include dummy questions in some scenarios. As a non-limiting example, the challenge generation service 121 may generate ten questions to be presented to the user.

The authentication application 118 may configure a user interface to present a form embodying the challenges 127, which is sent to the client 109 over the network 112 for rendering by the authentication client application 184. The form may include short-answer questions, multiple choice questions, binary answer questions, prompts to scan a fingerprint, prompts to provide a voice sample, and so on. The form may employ any number of user interface components such as selectable links, buttons, checkboxes, radio buttons, sliders, drop-down boxes, etc. to elicit user input.

The user may then choose to answer any number of the challenges 127. The user may choose to answer all, some, one, or none of the challenges 127. In other words, the user may answer a subset of the challenges 127. The responses 130 to the subset of the challenges 127 are input and sent from the authentication client application 184 to the authentication application 118 by way of the network 112.

The response validation service 124 of the authentication application 118 then validates the responses 130 to the subset of the challenges 127. The response validation service 124 may compare the responses 130 to stored answers 154 in the case of preselected questions 172. The response validation service 124 may also refer to some other stored answer data 175 and/or other data associated with the user account data 142 to determine whether a response 130 is correct. In some situations, the response validation service 124 may validate a response 130 with an external validation provider 139 by way of the network 112.

The authentication application 118 determines authentication point values 178 associated with each response 130. For example, each correct response 130 might be worth 10 points. Different challenges 127 may be associated with different weights related to confidence and thus different point values. Thus, a response 130 to one relatively easy challenge 127 might be worth 5 points, while a response 130 to a relatively hard challenge 127 might be worth 20 points. Some challenges 127 might have multiple correct responses 130 or responses 130 that are partially correct. Therefore, different correct, or partially correct, responses 130 to the same challenge 127 might earn different point values for the user. For example, a greater level of specificity in the response 130 may earn greater point values. The point values may be determined based at least in part on the preselected questions 172, the account type 163, the secured resources 166, factors relating to longevity 169, client characteristics 157, and on other data.

Non-limiting examples of challenges 127 may include a prompt for a security credential 151 such as a password, one-time password, key, etc.; a prompt for a voice sample; a prompt to take an image of the user's face; a prompt for the user to scan his or her fingerprint; preselected questions 172 such as city of birth, high school mascot, name of favorite pet, etc.; dynamically generated questions based at least in part on order history 160, demographic data, addresses, contact information, payment instruments, etc.; dummy questions; and so on. Where an order history 160 is available, the challenge generation service 121 might generate questions inquiring as to a total price for a recent order, when an order for a particular item was placed, etc. If a location determined for the client 109 indicates that the client 109 may be in another country or otherwise far away from the usage patterns of the user account, the challenges 127 may include culturally relevant questions that may be easy for the legitimate user to answer but difficult for a malicious user to answer. If the user account is associated with a past due balance, a challenge 127 may elicit a payment instrument capable of external validation that may be used to pay the past due balance.

Point values may depend at least in part on recency of the data associated with the challenge 127 (e.g., older data might be more easily accessible by unauthorized users), longevity 169 of the data associated with the challenge 127 (e.g., a one-time password sent to a phone number that has been associated with the account for several years might be heavily weighted), difficulty of unauthorized access of the data (e.g., last four digits of a credit card are easily found on discarded credit card slips so such a challenge 127 might not be heavily weighted), and other factors.

In addition to the various forms of identity proof discussed above, observed behavior may also be employed to determine or verify identity. Various approaches to incorporating user behavior into identity verification and authentication are disclosed in U.S. patent application Ser. No. 13/555,724, filed on Jul. 23, 2012, and entitled "BEHAVIOR-BASED IDENTITY SYSTEM," which is incorporated herein by reference in its entirety. Behavior of the user at the client 109 may be observed and compared with previously observed behavior data 171 to determine, at least in part, whether the user at the client 109 is who he or she claims to be. To this end, different point values may be associated with various observed forms of user behavior.

The point values are then used to compute a confidence score for the user indicating a degree of confidence as to whether the user is a legitimate user associated with the indicated account. As an example, the earned points may be added to an initial confidence score of zero, where a higher score indicates a higher degree of confidence. As another example, the earned points may be subtracted from an initial confidence score of 100, where a lower score indicates a higher degree of confidence.

The confidence score is then compared to a minimum confidence threshold. The minimum confidence threshold determines whether the user is authenticated for access. For example, with an initial confidence score of 0, the minimum confidence threshold may be 100. Alternatively, with an initial confidence score of 100, the minimum confidence threshold may be 0. The minimum confidence threshold may vary based at least in part on several factors. Alternatively, the thresholds may remain constant while the point values are adjusted based at least in part on the various factors.

The minimum confidence threshold may vary according to the account type 163 associated with the user account. For example, a system administrator account may require a much higher minimum confidence threshold than an ordinary user account. As a non-limiting example, a reduced minimum confidence threshold may be employed for an account type 163 corresponding to the account of a child for which purchases are limited to $200 in comparison to a minimum confidence threshold employed for another account type 163 corresponding to an account with no purchase limit.

The minimum confidence threshold may vary according to stored client characteristics 157 as compared to current characteristics of the client 109. To illustrate, the client 109 may be compared with devices used by the user account in the past. It may be determined whether the client 109 presents a certain unique device identifier, stored cookie value, or is located at a certain internet protocol (IP) address. The location of the client 109 (determined through global positioning system (GPS) coordinates, geolocation, entered location data, etc.) may be compared with stored locations of the client 109. The wireless LAN access point, cell tower, etc., to which the client 109 is currently connected may be compared to previous access points, cell towers, etc., to which an authenticated client 109 was previously connected. In some embodiments, the presence or absence of client characteristics 157 for a client 109 may contribute point values to, or subtract point values from, a confidence score or an inverse confidence score.

The minimum confidence threshold may vary according to longevity 169 of the account or the types of secured resources 166 to which access is desired by the user. As a non-limiting example, a reduced minimum confidence threshold may be employed for a secured resource 166 corresponding to the capability of accessing previously purchased music files in comparison to a minimum confidence threshold employed for another secured resource 166 corresponding to the capability of purchasing additional music files.

The presence of a hardware module in the client 109 may also affect the minimum confidence threshold and/or the types of challenges 127 that are presented. For example, if a secure hardware module is coupled to the client 109, this may be a strong indication that the user has possession of the client 109, and various relatively weak forms of authentication may be employed. To this end, voice recognition and/or face recognition may be employed as challenges 127 in lieu of, e.g., passwords, answers to knowledge-based questions, etc. In some cases, correct responses 130 to specific designated challenges 127 may be required. For example, a valid face recognition may be a prerequisite before additional challenges 127 involving knowledge-based questions are presented.

If the confidence score meets the minimum confidence threshold, the user may be authorized access to secured resources 166 associated with the user account. In some embodiments, different secured resources 166 may be associated with different minimum confidence thresholds such that a user may access one type of secured resource 166 with one confidence score and additional secured resources 166 with an increased confidence score. If the minimum confidence threshold is not met, the user may be presented with additional challenges 127 in some embodiments. Further, a user who is already authenticated with a lower confidence score to access one type of secured resource 166 may be forced to answer more challenges 127 to attempt to achieve a higher confidence score in order to gain access to a different type of secured resource 166. There may be a maximum number of challenges 127 that may be presented or some other determinant of when to stop presenting challenges 127 to the user.

A negative confidence threshold or an inverse confidence threshold may be employed. Such thresholds indicate a confidence that the user is not who he or she is claiming to be. With a negative confidence threshold, point values for incorrect answers may be subtracted from the confidence score or otherwise applied to decrease the confidence score. To illustrate, if an initial confidence score is 50, and a user answers two challenges 127 incorrectly, the point values for those challenges 127 (e.g., 5 and 10) may be subtracted from 50 to yield a confidence score of 35. If the negative confidence threshold is 40, the authentication application 118 has a sufficient confidence that the user is not the correct user.

It is noted that point values for incorrect responses 130 need not be the same as point values for correct responses 130. In some cases, incorrect responses 130 may be associated with no points. Further, challenges 127 that are not answered at all may be associated with a point value or no points. Where dummy questions are presented, an incorrect answer to a dummy question may be relatively costly in terms of decreasing the confidence score in some embodiments.

In addition, an inverse confidence score may be generated separately from the confidence score. Incorrect responses 130 and/or an absence of responses 130 may result in an increase to the inverse confidence score. The inverse confidence score may be compared with an inverse confidence threshold. The negative confidence threshold or the inverse confidence threshold may be determined based at least in part on the various factors used to determine the minimum confidence threshold. If the user reaches the negative confidence threshold or the inverse confidence threshold, the authentication application 118 may prevent the user from answering further challenges 127 (temporarily or indefinitely) and thereby deny the user access to any of the secured resources 166 associated with the user account. In one example scenario, the presence of multiple faces via a face detection or the presence of a particular face via a face recognition may subtract from a confidence score (or add to an inverse confidence score) so as to deny a user access to a secured resource 166.

In one embodiment, the order of the challenges 127 that are presented to the user may depend upon whether the user answers a previous challenge 127 correctly. For example, challenges 127 that are presented may be sequenced so as to be gradually harder to answer until the minimum confidence threshold is reached. In various embodiments, point values may be shown to the user or may be hidden from the user.

Figure 1B:
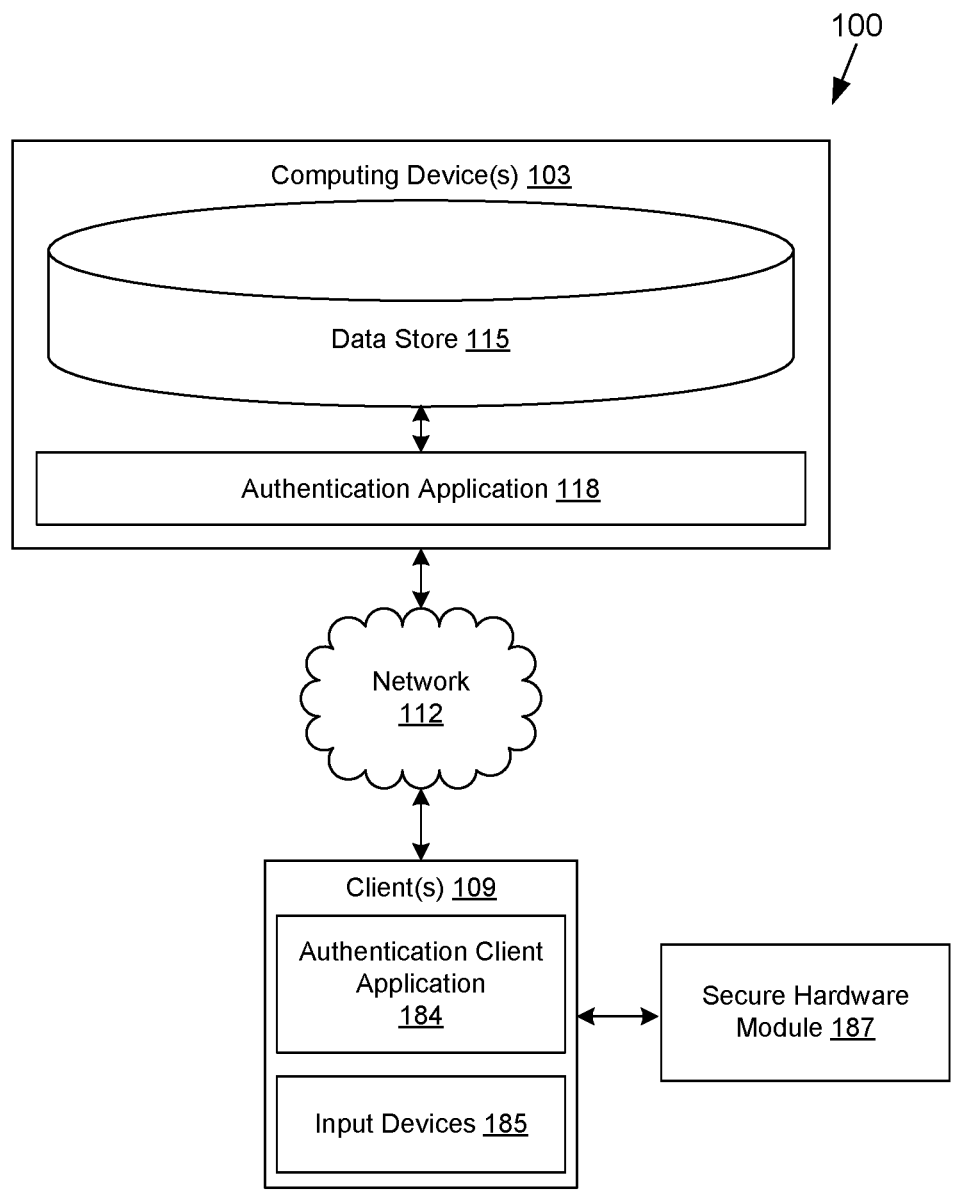

Turning now to FIG. 1B, shown is another example of the networked environment 100 according to various embodiments. In the example of FIG. 1B, the client 109 also includes various input devices 185. The input devices 185 may be present to facilitate responding to certain challenges 127 (FIG. 1A), such as those involving fingerprint scanning, voice recognition, face recognition, and so on. To this end, the input devices 185 may include, for example, cameras, biometric scanners, microphones, heat sensors, and/or other types of input devices 185.

Additionally, in the example of FIG. 1B, the client 109 may be coupled to a secure hardware module 187. The secure hardware module 187 may comprise a universal serial bus (USB) device, a dongle, a token, and/or other removable secure hardware. In one embodiment, for example, the secure hardware module 187 may be coupled to the client 109 via a headphone jack of the client 109. The secure hardware module 187 may be coupled to the client 109 using a variety of technologies. For example, near-field communication (NFC) and other approaches for short-range inter-device communication may also be utilized in accordance with the embodiments of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, the devices may utilize short-range, low-power and high-frequency radio transmissions, such as Bluetooth®. In still other embodiments, the devices may support acoustic-based data transfer. For example, one device may include software components and a speaker that enable the device to broadcast data to another device as sound waves, while the other device may include software components and microphone that enable the other device to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading the code from a magnetic stripe) may be used for inter-device communication. The protocols and components for enabling computing devices to perform the embodiments of the present disclosure using such approaches for inter-device communication are well known to those skilled in the art of computer communications and thus, need not be described in more detail herein.

The presence of the secure hardware module 187 may be a prerequisite for authentication via the authentication application 118, though various challenges 127 may still be presented to the user to verify that the user is who he or she claims to be. In one example, the secure hardware module 187 may facilitate accepting credit cards or other payment instruments via the client 109.

Figure 2A:
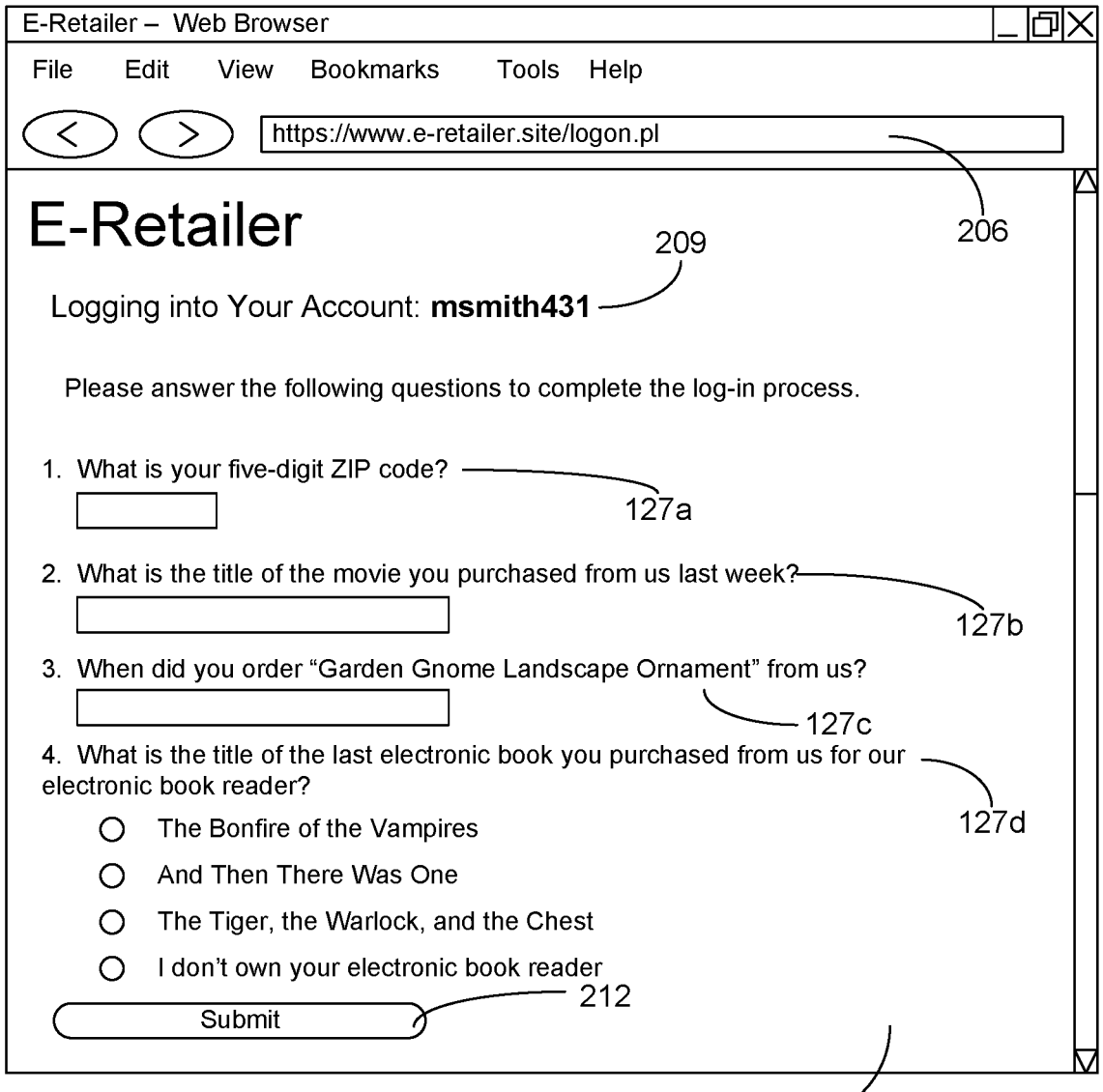
FIGS. 2A and 2B are drawings of examples of user interfaces rendered by clients in the networked environments of FIG. 1A and FIG. 1B according to various embodiments of the present disclosure.

Continuing on to FIG. 2A, shown is one example of a user interface 200 rendered by an authentication client application 184 (FIG. 1A) executed in a client 109 (FIG. 1A) in the networked environment 100 (FIG. 1A). The user interface 200 depicts a rendered network page 203 that was generated at least in part by the authentication application 118 (FIG. 1A). The rendered network page 203 facilitates answering various challenges 127a, 127b, 127c, and 127d to authenticate with the authentication application 118.

The user interface 200 includes an address bar 206 that indicates that the connection between the client 109 and the computing device 103 (FIG. 1A) over the network 112 (FIG. 1A) is encrypted (e.g., by secure sockets layer (SSL), hypertext transfer protocol secure (HTTPS), transport layer security (TLS), or other forms of security). The rendered network page 203 includes an indication 209 of the user account for which the user is attempting to authenticate. In this example, the user account is associated with a username "msmith431."

The first challenge 127a that is presented asks, "What is your five-digit ZIP code?" This challenge 127a may, for example, correspond to a question generated from data collected during the process of account enrollment. Because this challenge 127a is relatively common and because the answer may be relatively easy to obtain with research, the response 130 (FIG. 1A) may be given a relatively low point value.

The second challenge 127b that is presented asks, "What is the title of the movie you purchased from us last week?" Such a challenge 127b implicates data from the order history 160 (FIG. 1A) of the user account. This data may be difficult to obtain as it is not likely to be shared among entities unassociated with the electronic commerce system. Thus, the response 130 to the challenge 127b may be given a relatively high point value.

The third challenge 127c that is presented asks, "When did you order 'Garden Gnome Landscape Ornament' from us?" Such a challenge 127c also implicates data from the order history 160 of the user account. Likewise, data may be difficult to obtain as it is not likely to be shared among entities unassociated with the electronic commerce system. Thus, the response 130 to the challenge 127c may be given a relatively high point value. Additionally, such a purchase may have been made several years ago, and the longevity 169 (FIG. 1A) may implicate a greater or lesser point value depending on the situation. The user may be given partial credit depending upon what response 130 is provided (e.g., year vs. month and year vs. exact date).

The fourth challenge 127d asks, "What is the title of the last electronic book you purchased from us for our electronic book reader?" This challenge 127d may correspond to a dummy question. The user account data 142 may indicate that the user has not purchased an electronic book reader from the merchant. Therefore, because of the phrasing of the question, an authorized user may be tempted to select one of the electronic books listed as the answer, which may then be an important flag to the authentication application 118 that the user is not who he or she claims to be.

The rendered network page 203 may include a submit button 212 to submit the responses 130 to the authentication application 118. In some embodiments, the responses 130 may be submitted automatically after being entered or when the user moves on to the next challenge 127. The authentication application 118 may dynamically control which challenges 127 are presented in the user interface 200 based at least in part on previous responses 130. Although FIG. 2A depicts multiple challenges 127 being presented in the same user interface 200, in other embodiments, multiple challenges 127 may be presented one at a time to be answered or skipped one at a time through a series of different rendered network pages 203 or screens.

Figure 2B:
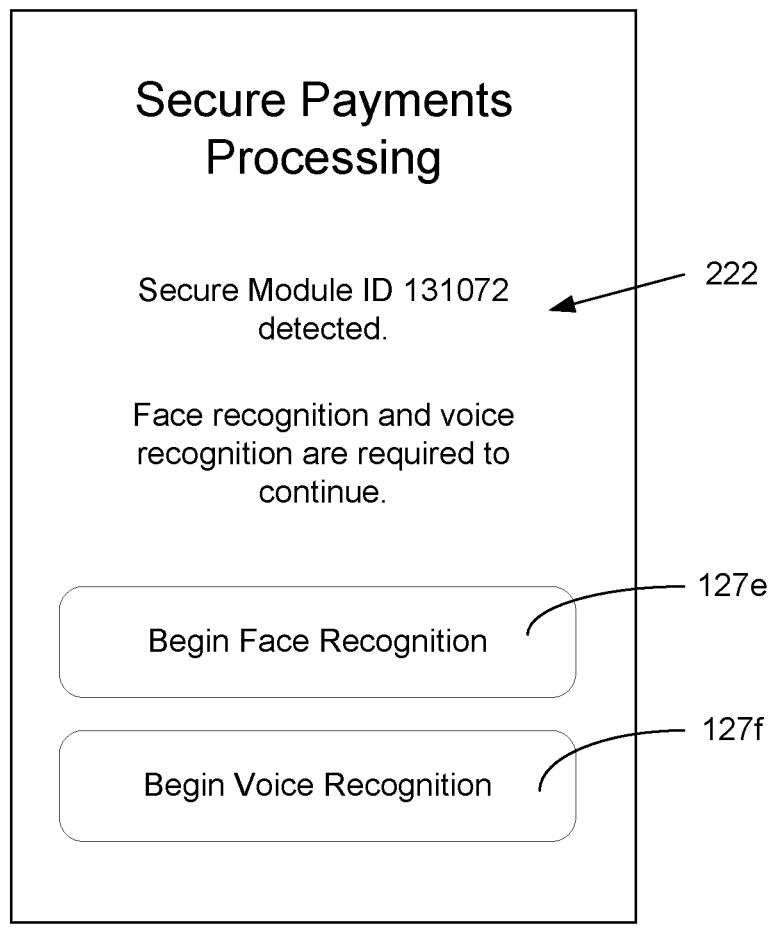

Moving on to FIG. 2B, shown is one example of a user interface 220 rendered by an authentication client application 184 (FIG. 1B) executed in a client 109 (FIG. 1B) in the networked environment 100 (FIG. 1B). The user interface 220 facilitates answering various challenges 127e and 127f in order to authenticate with the authentication application 118 (FIG. 1B). The user interface 220 includes a description 222 that informs the user that a particular secure hardware module 187 (FIG. 1B) has been detected and that challenges 127e and 127f corresponding to face recognition and voice recognition are required to continue with authentication. Selection of user interface components corresponding to challenges 127e and 127f may then respectively initiate capturing of video for face recognition, capturing of audio for voice recognition, and other functions.

In some scenarios, challenges 127 such as those depicted in FIG. 2A may be used in addition to, or in place of, the challenges 127e and 127f. Various point values may be assigned to the challenges 127. Confidence thresholds may be established, for example, based at least in part on client characteristics 157 (FIG. 1A) such as presence of the secure hardware module 187, unique device identifiers, currently connected cell towers, currently connected wireless LAN base stations, and other characteristics.

Figure 3:
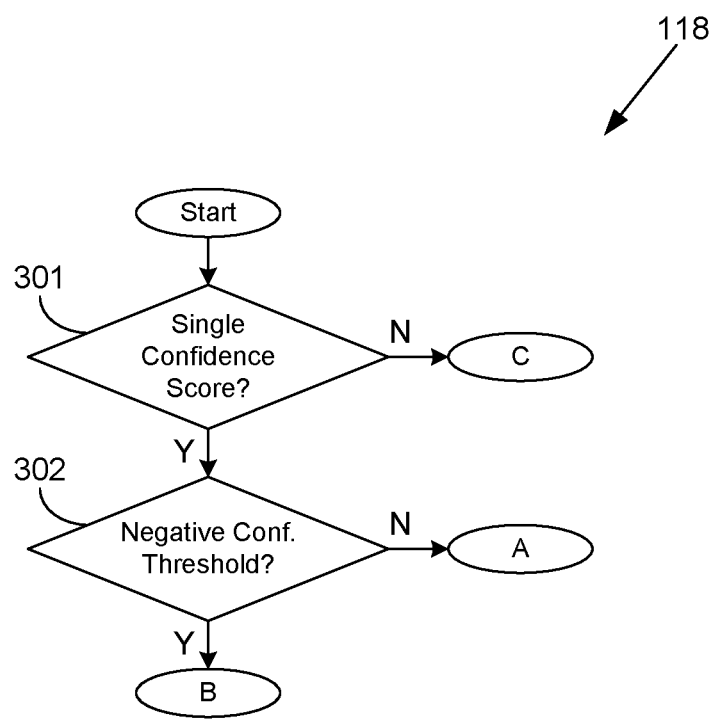
FIGS. 3-3C are flowcharts illustrating examples of functionality implemented as portions of an authentication application executed in a computing device in the networked environment of FIG. 1A according to various embodiments of the present disclosure.

Moving now to FIG. 3, shown is a flowchart that provides one example of the operation of a portion of the authentication application 118 according to one embodiment. Specifically, FIG. 3 shows which of the following three flowcharts (FIGS. 3A-3C) pertain to particular scenarios of operation for the authentication application 118. In box 301, it is determined whether a single confidence score is used. If a single confidence score is not used, the operation of the authentication application 118 continues in FIG. 3C, where both a confidence score and an inverse confidence score are used. If a single confidence score is used, the flowchart continues to box 302. In box 302, it is determined whether a negative confidence threshold is used. If a negative confidence threshold is used, the operation of the authentication application 118 continues in FIG. 3B. If a negative confidence threshold is not used, the operation of the authentication application 118 continues in FIG. 3A.

Figure 3A:
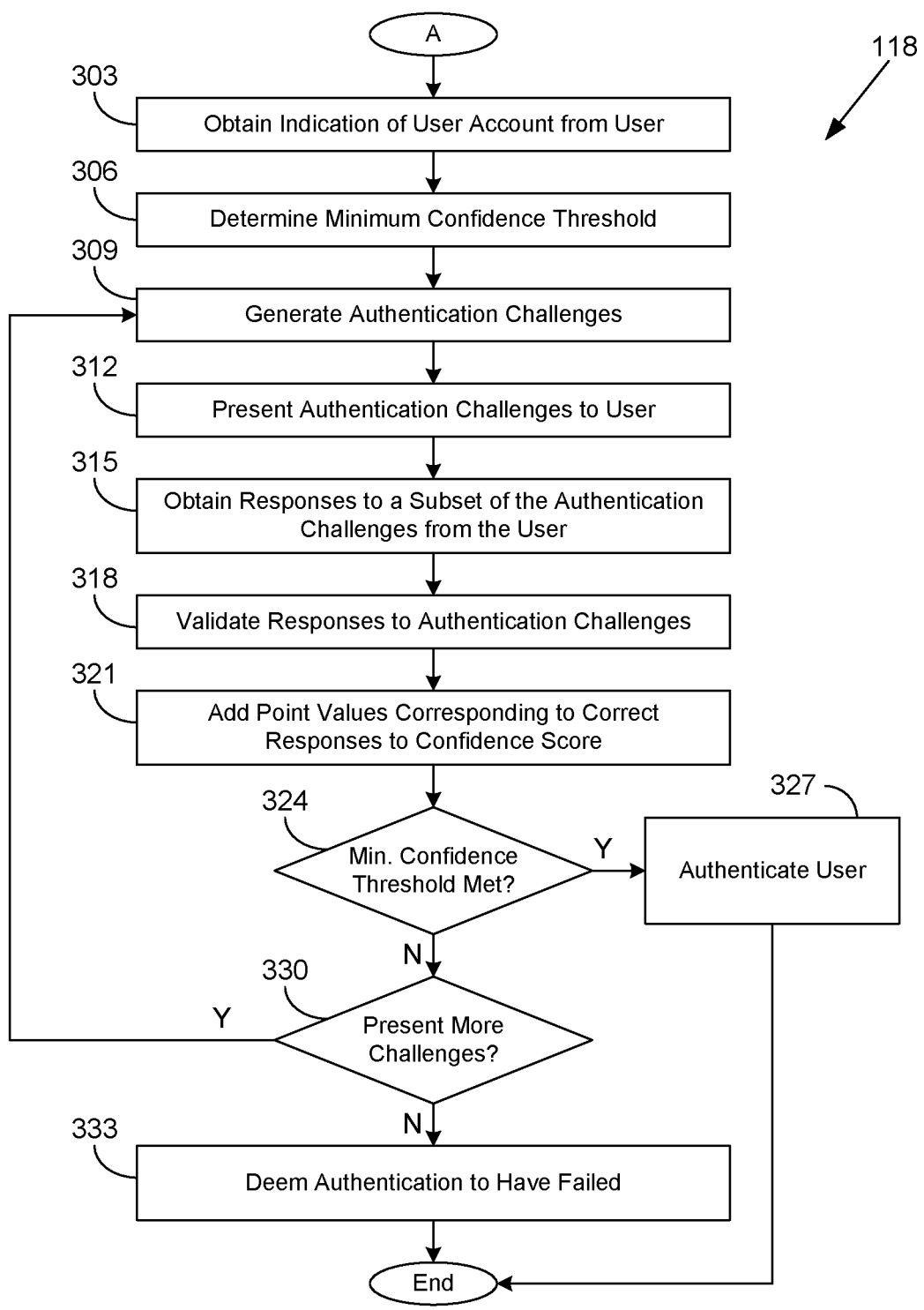

Referring next to FIG. 3A, shown is a flowchart that provides one example of the operation of a portion of the authentication application 118 according to one embodiment. It is understood that the flowchart of FIG. 3A provides merely an example of the many different types of functional arrangements that may be employed to implement the operation of the portion of the authentication application 118 as described herein. As an alternative, the flowchart of FIG. 3A may be viewed as depicting an example of steps of a method implemented in the computing device 103 (FIG. 1A) according to one or more embodiments.

Beginning with box 303, the authentication application 118 obtains an indication of a user account from a user. Although FIGS. 3A-3C refer to a user, it is understood that the authentication application 118 may in some cases be interacting with automated logic executed in a client 109 (FIG. 1A) or other computing device. Additionally, it is understood that the "user" may refer to a customer service agent, who may be prompting another user for responses 130 (FIG. 1A) to various challenges 127 (FIG. 1A). The other user may thus be authenticated as a consequence of the actions of the customer service agent via an authentication client application 184 (FIG. 1A).

The user may provide an identifier, a username, an account name, etc. to the authentication application 118 via a network page such as a logon screen. In box 306, the authentication application 118 determines a minimum confidence threshold using the threshold configuration data 148 (FIG. 1A). The minimum confidence threshold may depend at least in part on an account type 163 (FIG. 1A) associated with the account, the secured resources 166 (FIG. 1A) to be accessed by the account, factors relating to account or data longevity 169 (FIG. 1A), client characteristics 157 (FIG. 1A), and/or other factors.

In box 309, the challenge generation service 121 (FIG. 1A) of the authentication application 118 generates a set of authentication challenges 127 based at least in part on the challenge data 145 (FIG. 1A) and the stored user account data 142 (FIG. 1A). The challenges 127 may be associated with differing authentication point values 178 (FIG. 1A). In some cases, a challenge 127 may have multiple choices that are correct, which may also be associated with differing authentication point values 178. The challenges 127 may include dummy challenges 127 generated based at least in part on the dummy question data 181 (FIG. 1A). In some cases, certain authentication challenges 127 may be required to be answered based at least in part on the client characteristics 157 (FIG. 1A). In one scenario, where a client 109 is coupled to a secure hardware module 187 (FIG. 1A), the challenges 127 may include face recognition, voice recognition, and/or other relatively weak forms of authentication. In box 312, the authentication application 118 presents the authentication challenges 127 to the user, e.g., through a network page or other network data sent to the client 109 (FIG. 1A) over the network 112 (FIG. 1A).

In box 315, the authentication application 118 obtains responses 130 to a subset of the authentication challenges 127 from the client 109 over the network 112. The user may choose to respond to zero or more of the challenges 127. In box 318, the authentication application 118 validates the provided responses 130 to the subset of the challenges 127 with the response validation service 124 (FIG. 1A). The responses 130 are validated as being correct or incorrect. In box 321, the authentication application 118 adds the authentication point values 178 corresponding to the responses 130 that are correct to the confidence score for the user. The confidence score may be initially set at some predetermined value.

In box 324, the authentication application 118 determines whether the confidence score for the user meets the minimum confidence threshold determined in box 306. If the confidence score does meet the threshold, the user is authenticated and the authentication application 118 proceeds to box 327. In box 327, the authentication application 118 authenticates the user as being associated with the user account. Subsequently, the authenticated user at the client 109 may be authorized to access one or more secured resources 166 associated with the user account. Thereafter, the portion of the authentication application 118 ends.

If, by contrast, the confidence score does not meet the threshold, the authentication application 118 instead moves from box 324 to box 330. In box 330, the authentication application 118 determines whether additional challenges 127 may be presented to the user in order for the user to attempt to increase his or her confidence score. If additional challenges 127 may be presented, the authentication application 118 returns to box 309 and generates additional challenges 127. If additional challenges 127 are not to be presented, the user is not authenticated, and the authentication application 118 moves from box 330 to box 333. In box 333, the authentication application 118 deems authentication for the user account to have failed. Access by the client 109 to anonymously accessible resources may be authorized, but access by the client 109 to the secured resources 166 of the user account may be denied. Thereafter, the portion of the authentication application 118 ends.

Figure 3B:
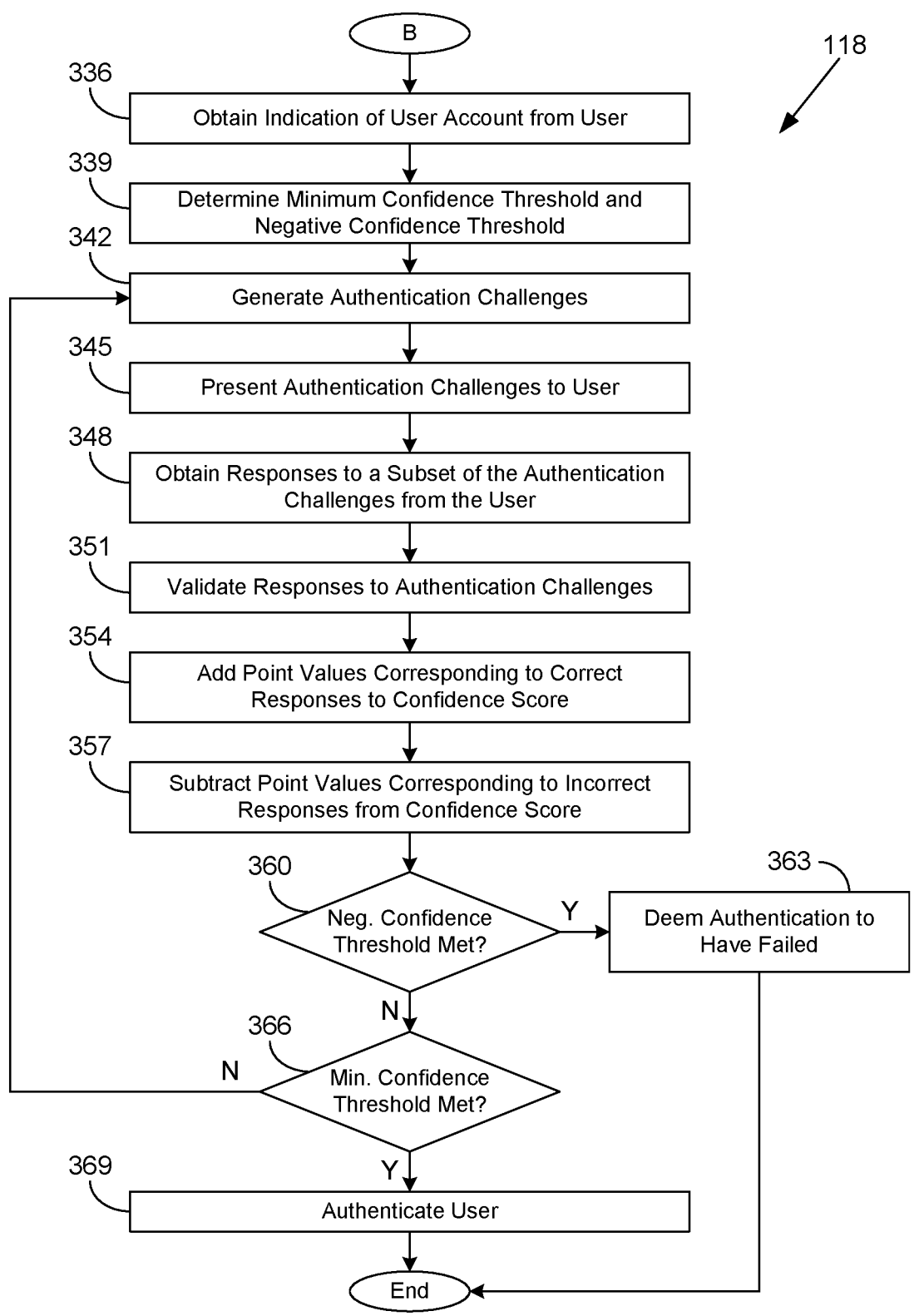

Turning now to FIG. 3B, shown is a flowchart that provides one example of the operation of a portion of the authentication application 118 according to another embodiment. It is understood that the flowchart of FIG. 3B provides merely an example of the many different types of functional arrangements that may be employed to implement the operation of the portion of the authentication application 118 as described herein. As an alternative, the flowchart of FIG. 3B may be viewed as depicting an example of steps of a method implemented in the computing device 103 (FIG. 1A) according to one or more embodiments.

Beginning with box 336, the authentication application 118 obtains an indication of a user account from a user. For example, the user may provide an identifier, a username, an account name, etc. to the authentication application 118 via a network page such as a logon screen. In box 339, the authentication application 118 determines a minimum confidence threshold and a negative confidence threshold using the threshold configuration data 148 (FIG. 1A). The minimum confidence threshold and the negative confidence threshold may depend at least in part on an account type 163 (FIG. 1A) associated with the account, the secured resources 166 (FIG. 1A) to be accessed by the account, factors relating to account or data longevity 169 (FIG. 1A), client characteristics 157 (FIG. 1A), and/or other factors.

In box 342, the challenge generation service 121 (FIG. 1A) of the authentication application 118 generates a set of authentication challenges 127 (FIG. 1A) based at least in part on the challenge data 145 (FIG. 1A) and the stored user account data 142 (FIG. 1A). The challenges 127 may be associated with differing authentication point values 178 (FIG. 1A). In some cases, a challenge 127 may have multiple choices that are correct, which may also be associated with differing authentication point values 178. The challenges 127 may include dummy challenges 127 generated based at least in part on the dummy question data 181

(FIG. 1A). In box 345, the authentication application 118 presents the authentication challenges 127 to the user, e.g., through a network page or other network data sent to the client 109 (FIG. 1A) over the network 112 (FIG. 1A).

In box 348, the authentication application 118 obtains responses 130 (FIG. 1A) to a subset of the authentication challenges 127 from the client 109 over the network 112. The user may choose to respond to zero or more of the challenges 127. In box 351, the authentication application 118 validates the provided responses 130 (FIG. 1A) to the subset of the challenges 127 with the response validation service 124 (FIG. 1A). The responses 130 are validated as being correct or incorrect. In box 354, the authentication application 118 adds the authentication point values 178 corresponding to the responses 130 that are correct to the confidence score for the user. The confidence score may be initially set at some predetermined value. In box 357, the authentication application 118 subtracts the authentication point values 178 corresponding to incorrect responses 130 from the confidence score. It is noted that the subtracted point values may be different from the added point values for responses to a given challenge 127.

In box 360, the authentication application 118 determines whether the confidence score meets the negative confidence threshold determined in box 339. For example, the confidence score may fall beneath a predetermined value as a result of subtractions in box 357. In some cases, non-answered challenges 127 may not affect the confidence score. If the negative confidence threshold is met, the authentication application 118 proceeds to box 363 and deems authentication for the user account to have failed. In other words, the authentication application 118 has confidence that the user is not who he or she is claiming to be, and access by the client 109 to secured resources 166 associated with the user account may be denied. In some cases, the client 109 may then be permitted to access anonymously accessible resources. Thereafter, the portion of the authentication application 118 ends.

If, instead, the authentication application 118 determines in box 360 that the negative confidence threshold is not met, the authentication application 118 proceeds from box 360 to box 366. In box 366, the authentication application 118 determines whether the confidence score for the user meets the minimum confidence threshold determined in box 339. If the confidence score does meet the threshold, the user is authenticated and the authentication application 118 proceeds to box 369. In box 369, the authentication application 118 authenticates the user as being associated with the user account. The client 109 may then be authorized to access one or more secured resources 166 associated with the user account. Thereafter, the portion of the authentication application 118 ends. If, by contrast, the confidence score does not meet the minimum confidence threshold in box 366, the authentication application 118 instead returns to box 342 and generates additional challenges 127.

Figure 3C:
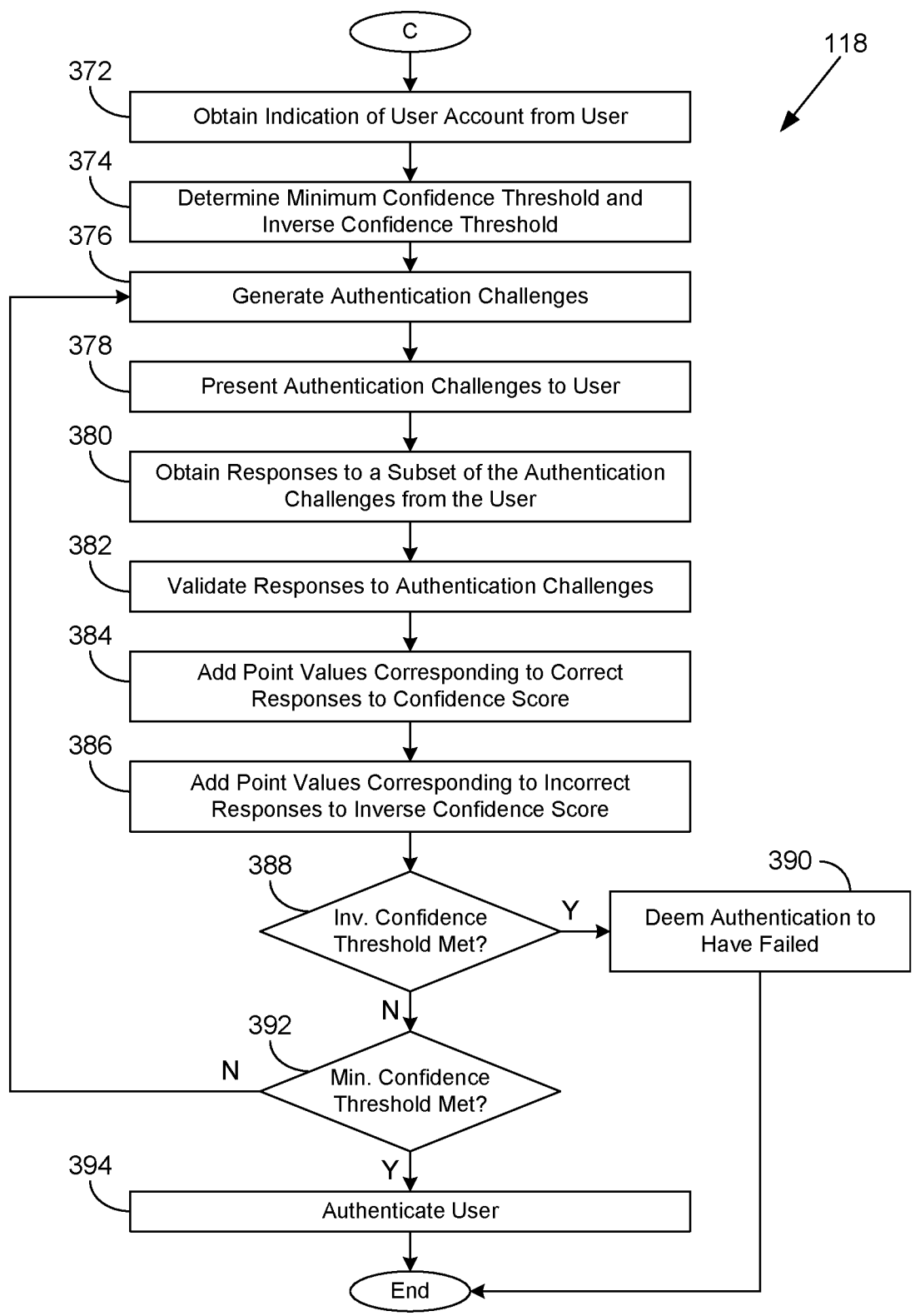

Moving on to FIG. 3C, shown is a flowchart that provides one example of the operation of a portion of the authentication application 118 according to yet another embodiment. It is understood that the flowchart of FIG. 3C provides merely an example of the many different types of functional arrangements that may be employed to implement the operation of the portion of the authentication application 118 as described herein. As an alternative, the flowchart of FIG. 3C may be viewed as depicting an example of steps of a method implemented in the computing device 103 (FIG. 1A) according to one or more embodiments.

Beginning with box 372, the authentication application 118 obtains an indication of a user account from a user. For example, the user may provide an identifier, a username, an account name, etc. to the authentication application 118 via a network page such as a logon screen. In box 374, the authentication application 118 determines a minimum confidence threshold and an inverse confidence threshold using the threshold configuration data 148 (FIG. 1A). The minimum confidence threshold and the inverse confidence threshold may depend at least in part on an account type 163 (FIG. 1A) associated with the account, the secured resources 166 (FIG. 1A) to be accessed by the account, factors relating to account or data longevity 169 (FIG. 1A), client characteristics 157 (FIG. 1A), and/or other factors.

In box 376, the challenge generation service 121 (FIG. 1A) of the authentication application 118 generates a set of authentication challenges 127 (FIG. 1A) based at least in part on the challenge data 145 (FIG. 1A) and the stored user account data 142 (FIG. 1A). The challenges 127 may be associated with differing authentication point values 178 (FIG. 1A). In some cases, a challenge 127 may have multiple choices that are correct, which may also be associated with differing authentication point values 178. The challenges 127 may include dummy questions generated based at least in part on the dummy question data 181 (FIG. 1A). In box 378, the authentication application 118 presents the authentication challenges 127 to the user, e.g., through a network page or other network data sent to the client 109 (FIG. 1A) over the network 112 (FIG. 1A).

In box 380, the authentication application 118 obtains responses 130 (FIG. 1A) to a subset of the authentication challenges 127 from the client 109 over the network 112. The user may choose to respond to zero or more of the challenges 127. In box 382, the authentication application 118 validates the provided responses 130 to the subset of the challenges 127 with the response validation service 124 (FIG. 1A). The responses 130 are validated as being correct or incorrect. In box 384, the authentication application 118 adds the authentication point values 178 corresponding to the responses 130 that are correct to the confidence score for the user. In box 386, the authentication application 118 adds the authentication point values 178 corresponding to incorrect responses 130 to the inverse confidence score. The confidence score and the inverse confidence score may be initially set at predetermined values. It is noted that the added point values to the inverse confidence score may be different from the added point values to the confidence score for responses to a given challenge 127.

In box 388, the authentication application 118 determines whether the confidence score meets the inverse confidence threshold determined in box 374. In some cases, non-answered challenges 127 may not affect the inverse confidence score. If the inverse confidence threshold is met, the authentication application 118 proceeds to box 390 and deems authentication for the user account to have failed. In other words, the authentication application 118 has confidence that the user is not who he or she is claiming to be. The user may be authorized to access anonymously accessible resources, but not the secured resources 166 associated with the user account. Thereafter, the portion of the authentication application 118 ends.

If, instead, the authentication application 118 determines in box 388 that the inverse confidence threshold is not met, the authentication application 118 proceeds from box 388 to box 392. In box 392, the authentication application 118 determines whether the confidence score for the user meets the minimum confidence threshold determined in box 374.

If the confidence score does meet the threshold, the authentication application 118 proceeds to box 394. In box 394, the authentication application 118 authenticates the user as being associated with the user account. The user may then be authorized to access one or more secured resources 166 associated with the user account. Thereafter, the portion of the authentication application 118 ends. If, by contrast, the confidence score does not meet the minimum confidence threshold in box 392, the authentication application 118 instead returns to box 376 and generates additional challenges 127.

Figure 4:
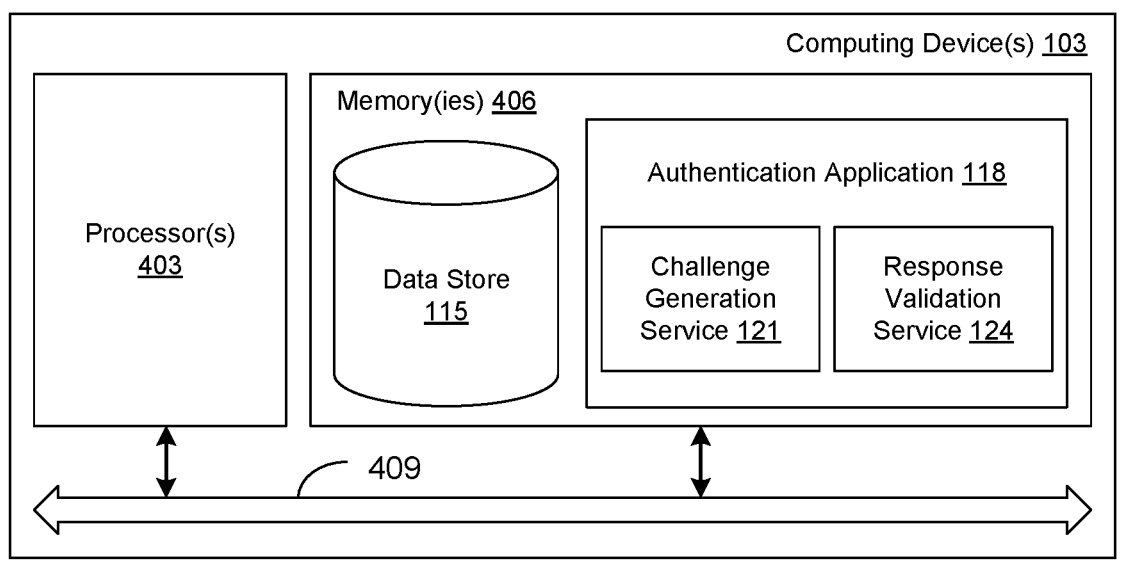
FIG. 4 is a schematic block diagram that provides one example illustration of a computing device employed in the networked environment of FIG. 1A according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the authentication application 118, the challenge generation service 121, the response validation service 124, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the authentication application 118, the challenge generation service 121, the response validation service 124, the authentication client application 184 (FIG. 1A), the external validation provider 139 (FIG. 1A), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-3C show the functionality and operation of an implementation of portions of the authentication application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3-3C show a specific order of execution, it is understood that the order of execution may differ from that which is depicted. For example, the order of execution of two or more blocks may be scrambled relative to the order shown. Also, two or more blocks shown in succession in FIGS. 3-3C may be executed concurrently or with partial concurrence. Further, in some embodiments, one or more of the blocks shown in FIGS. 3-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication application 118, the challenge generation service 121, the response validation service 124, the authentication client application 184, and the external validation provider 139, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one first computing device; and
   an authentication application executable in the at least one first computing device, wherein when executed the authentication application causes the at least one first computing device to at least:
   receive an identification of a user account from a second computing device;
   determine whether a particular hardware module is coupled to the second computing device;
   generate a plurality of authentication challenges based at least in part on whether the particular hardware module is coupled to the second computing device;
   present the plurality of authentication challenges via a user interface of the second computing device;
   determine a minimum confidence threshold based at least in part on whether the particular hardware module is coupled to the second computing device;
   generate a confidence score for the second computing device in response to receiving corresponding responses to individual ones of at least one of the plurality of authentication challenges from the second computing device, individual ones of the corresponding responses being associated with a respective authentication point value, the confidence score being increased by the respective authentication point values of the corresponding responses that are correct; and
   authenticate the second computing device for access to the user account in response to determining that the confidence score meets the minimum confidence threshold.

2. The system of claim 1, wherein when executed the authentication application is further configured to cause the at least one first computing device to at least deny authentication of the second computing device for access to the user account in response to determining that the particular hardware module is not coupled to the second computing device.

3. The system of claim 1, wherein at least two of the corresponding responses that are correct are associated with different respective authentication point values that correspond to the respective authentication challenges.

4. The system of claim 1, wherein the plurality of authentication challenges includes a face recognition challenge in response to determining that the particular hardware module is coupled to the second computing device.

5. The system of claim 1, wherein the plurality of authentication challenges includes a voice recognition challenge in response to determining that the particular hardware module is coupled to the second computing device.

6. The system of claim 1, wherein the particular hardware module is coupled to the second computing device via a headphone jack of the second computing device.

7. The system of claim 1, wherein the particular hardware module is coupled to the second computing device via a wireless data connection.

8. The system of claim 1, wherein the particular hardware module facilitates accepting a payment instrument through the second computing device.

9. A method, comprising:
   receiving, via at least one of one or more first computing devices, an identification of a user account from a second computing device;
   determining, via at least one of the one or more first computing devices, a longevity associated with the user account;
   causing, via at least one of the one or more first computing devices, a plurality of authentication challenges to be presented via a user interface of the second computing device;
   generating, via at least one of the one or more first computing devices, a confidence score for the second computing device in response to receiving corresponding responses to individual ones of at least one of the plurality of authentication challenges from the second computing device, individual ones of the corresponding responses being associated with a respective authentication point value, the confidence score being increased by the respective authentication point values of the corresponding responses that are correct;

determining, via at least one of the one or more first computing devices, a minimum confidence threshold based at least in part on the longevity associated with the user account; and authenticating, via at least one of the one or more first computing devices, the second computing device for access to the user account in response to determining that the confidence score meets the minimum confidence threshold.

10. The method of claim 9, further comprising generating, via at least one of the one or more first computing devices, the plurality of authentication challenges based at least in part on the longevity associated with the user account.

11. The method of claim 9, wherein at least two of the corresponding responses that are correct are associated with different respective authentication point values that correspond to the respective authentication challenges.

12. The method of claim 9, wherein the longevity indicates a length of time since the user account was created.

13. The method of claim 9, wherein the longevity indicates a length of time that the user account has been active.

14. The method of claim 9, wherein the longevity indicates a length of time that a billing address or a telephone number has been associated with the user account.

15. A system, comprising:
at least one first computing device; and
an authentication application executable in the at least one first computing device, wherein when executed the authentication application causes the at least one first computing device to at least:
receive an identification of a user account from a second computing device;
determine that a security credential reset is requested for the user account;
present a plurality of authentication challenges via a user interface of the second computing device;
generate a confidence score for the second computing device in response to receiving corresponding responses to individual ones of at least one of the plurality of authentication challenges from the second computing device, individual ones of the corresponding responses being associated with a respective authentication point value, the confidence score being increased by the respective authentication point values of the corresponding responses that are correct;
determine a minimum confidence threshold based at least in part on the security credential reset being requested for the user account; and
authenticate the second computing device for access to the user account in response to determining that the confidence score meets the minimum confidence threshold.

16. The system of claim 15, wherein at least two of the corresponding responses that are correct are associated with different respective authentication point values that correspond to the respective authentication challenges.

17. The system of claim 15, wherein at least one of the plurality of authentication challenges comprises a culturally relevant question that is relevant to a culture associated with the user account.

18. The system of claim 17, wherein the culturally relevant question is selected in response to determining a location of the second computing device.

19. The system of claim 15, wherein at least one of the respective authentication point values is based at least in part on a recency of data associated with the corresponding authentication challenges.

20. The system of claim 15, wherein the minimum confidence threshold is determined further based at least in part on whether a particular hardware module is coupled to the second computing device.

* * * * *